(12) United States Patent
Parkås et al.

(10) Patent No.: US 12,247,348 B2
(45) Date of Patent: Mar. 11, 2025

(54) METHOD FOR DECOLORING OF A TEXTILE MATERIAL

(71) Applicant: SÖDRA SKOGSÄGARNA EKONOMISK FÖRENING, Växjö (SE)

(72) Inventors: Jim Parkås, Varberg (SE); Anna Palme, Kållered (SE); Harald Brelid, Gothenburg (SE)

(73) Assignee: SÖDRA SKOGSÄGARNA EKONOMISK FÖRENING, Växjö (SE)

( * ) Notice: Subject to any disclaimer, the term of this patent is extended or adjusted under 35 U.S.C. 154(b) by 0 days.

(21) Appl. No.: 18/548,590

(22) PCT Filed: Feb. 28, 2022

(86) PCT No.: PCT/SE2022/050204
§ 371 (c)(1),
(2) Date: Sep. 1, 2023

(87) PCT Pub. No.: WO2022/186754
PCT Pub. Date: Sep. 9, 2022

(65) Prior Publication Data
US 2024/0044069 A1     Feb. 8, 2024

(30) Foreign Application Priority Data

Mar. 4, 2021 (SE) .................................. 2150245-5

(51) Int. Cl.
*D06L 4/00* (2017.01)
*D06P 5/13* (2006.01)

(52) U.S. Cl.
CPC ............... *D06L 4/00* (2017.01); *D06P 5/131* (2013.01)

(58) Field of Classification Search
CPC .................................. D06L 4/00; D06P 5/131
See application file for complete search history.

(56) References Cited

U.S. PATENT DOCUMENTS

| | | | |
|---|---|---|---|
| 3,644,081 A | 2/1972 | Matsuda et al. | |
| 4,007,305 A | 2/1977 | Kakar et al. | |
| 5,951,714 A * | 9/1999 | Hall | D06P 5/15 8/102 |
| 2019/0218362 A1 * | 7/2019 | Barla | C08J 11/26 |

FOREIGN PATENT DOCUMENTS

| | | | | |
|---|---|---|---|---|
| CN | 105852714 | | 8/2016 | |
| CN | 106065541 | | 11/2016 | |
| EP | 0687759 A1 * | | 6/1994 | ............ D06C 23/02 |
| EP | 1067235 A1 | | 1/2001 | |
| EP | 3412826 A1 * | | 12/2018 | |
| EP | 3092335 B1 * | | 5/2019 | ............ C08J 11/04 |
| EP | 3770208 * | | 1/2021 | |
| JP | H05239783 * | | 9/1993 | ............ D21B 1/325 |
| JP | H0913287 A * | | 1/1997 | ............ D06P 5/151 |
| SU | 1502671 | | 8/1989 | |
| WO | WO 2010006163 A1 * | | 1/2010 | ............ D21C 5/025 |
| WO | WO 2020/013755 | | 1/2020 | |

OTHER PUBLICATIONS

International Search Report and Written Opinion were mailed on Mar. 6, 2022 by the International Searching Authority for International Application No. PCT/SE2022/050204 filed on Feb. 28, 2022 and published as WO 2022/186754 (Applicant—Södra Skogsägarna Ekonomisk Förening) (10 pages).

Määttänen M., Asikainen S., Kamppuri T., et al. (2019), Colour management in circular economy: decolourization of cotton waste, Research Journal of Textile and Apparel 23 134-152.

* cited by examiner

*Primary Examiner* — Amina S Khan
(74) *Attorney, Agent, or Firm* — Ballard Spahr LLP (57) ABSTRACT

Described is a method for decoloring of a textile material, the method includes the steps of: providing a textile material; providing an alkaline solution containing one or more anionic polyelectrolytes; treating the textile material in the alkaline solution during a treatment period; and recovering at least some of the textile material from the alkaline solution.

15 Claims, 5 Drawing Sheets

METHOD FOR DECOLORING OF A TEXTILE MATERIAL

CROSS-REFERENCE TO RELATED APPLICATIONS

This application is a U.S. National Phase Application of International Application No. PCT/SE2022/050204, filed Feb. 2, 2022, which claims priority to Swedish Application No. 2150245-5, filed Mar. 4, 2021, each of which are hereby incorporated by reference in their entirety.

TECHNICAL FIELD

This invention relates to a method for treatment of a textile material to effect decoloring of the textile material. In particular, the invention relates to methods for decoloring and recycling textile material.

BACKGROUND OF THE INVENTION

Recycling of textile materials is becoming increasingly important. A process for recycling of textile materials may involve decoloring of the material and may also involve separation of different kinds of textile material, such as separating cellulosic material from polyester material.

WO2020/013755 discloses an example of a process related to textile material recycling where cellulosic material is separated from a raw material containing both cellulosic and polyester material. An example of a decoloring process is disclosed in EP1067235A1.

Known processes for decoloring of textile materials are typically either not very efficient or involve several process steps and chemicals that, if to be combined with a textile material recycling process, would make the resulting recycling process rather complex (Määttänen M., Asikainen S., Kamppuri T., et al. (2019), Colour management in circular economy: decolourization of cotton waste, Research Journal of Textile and Apparel 23 134-152, https://doi.org/10.1108/RJTA-10-2018-0058).

CN105852714 A discloses a method for converting cotton textile waste into bath towels. The textile waste is soaked in water containing sodium hydroxide and CMC. The treated textile is washed, dewatered, dried, chopped and carded to regeneration cotton. The recovered textile material is blended with bamboo fibre and viscose to make a yarn which is used for making bath towels.

SU1502671 A1 discloses a household bleach composition comprising alkali and CMC and a method for bleaching laundry with the composition.

U.S. Pat. No. 3,644,081 A discloses a process for improving the handling of polyester fibrous materials, i.e., making the materials softer and silkier. The process involves impregnating the treated textile with alkali and CMC or other hydrocolloids.

U.S. Pat. No. 4,007,305 A discloses a method of imparting soil release and soil repellency properties to textile materials, in particular man-made textile materials, with less use of fluorochemicals. The treatment involves contacting a textile material with an alkaline aqueous medium containing a dissolved water-soluble hydrophilic soil release polymer containing carboxylic acid groups.

CN106065541 B discloses a deinking agent for office waste paper and a process for its preparation.

There is thus a need for a process that decolors textile materials efficiently. There is also a need for an efficient decoloring process that is suitable for being included in a process for recycling of such materials.

SUMMARY OF THE INVENTION

An object of this invention is to provide a method for treatment of a textile material that exhibits improved decoloring efficiency and that is also better adapted to be included in textile material recycling processes compared to conventional methods. This and other objects may be achieved by the method defined by the technical features contained in claim 1. Variations of the disclosure are set out in the dependent claims and in the following description.

The invention concerns a method for decoloring of a textile material, the method comprising the steps of: providing a textile material, at least a portion of the textile material being colored; providing an alkaline solution containing one or more anionic polyelectrolytes; treating the textile material in the alkaline solution during a treatment period of at least 10 minutes at a temperature in the range of from 100° C. to 180° C.; and recovering at least some of the textile material from the alkaline solution after the treatment period.

As will be further described below, the decoloring method of this disclosure is based on the finding that the presence of an anionic polyelectrolyte in the alkaline solution, such as carboxymethyl cellulose (CMC), significantly improves decoloring of textile materials. The method is not effective only for textile material coloured by dyeing but also for textile material coloured by pigmenting.

Besides having a decoloring effect, the method as disclosed herein can be integrated in an efficient way in a process for recycling of textile material, in particular where such a process is based on treating the textile material in an alkaline solution, such as the process disclosed in WO2020/013755. By adding an anionic polyelectrolyte, such as CMC, to the alkaline solution of WO2020/013755, separation of cellulosic fibers from polyester fibers as well as decoloring of colored fibers can be carried out simultaneously.

The method may comprise adding the one or more anionic polyelectrolytes to the alkaline solution. This may be done intermittently or continuously.

The term "treating" means in this case typically that the textile material is immersed in the alkaline solution and processed therein during a treatment period. The alkaline solution is typically an aqueous solution with very high pH, such as a pH above 11.

The textile material intended for decoloring, i.e., the textile material provided in the first step, may be denoted textile raw material. The textile material recovered (by e.g., filtering) in the last step may be denoted recovered textile material.

The method may comprise further steps for treatment of the recovered decolored material concerning e.g., additional cleaning and/or purification process steps, such as bleaching of a recovered cellulosic part, washing, screening, viscosity adjustments of the recovered cellulosic part, and/or drying.

"Dyeing" as referred to herein, is typically carried out with dyes that have affinity for the fibers and that can be made soluble in the dyeing media. Classification of dyes can be made both depending on dyeing method (e.g., reactive dyes, direct dyes, or vat-dyes) and based on the key structure of the dye (e.g., azo dyes, phthalocyanine dyes and anthraquinone dyes). Depending on the fiber type, different dyeing methods are used, as there must be an interaction between the fibers and the dye/dyeing system.

Coloring by "pigmenting", as referred to herein, typically involves printing systems based on pigments that generally are very stable and resistant to chemical degradation and where the pigments are essentially water insoluble and are applied as suspensions. Pigments generally exhibit a low affinity to textile fibers, requiring the use of a polymer binder to protect the print/textile from abrasion and wear. Pigmenting of whole textiles and garments are sometimes also performed with insoluble pigments in a manner similar to pigment printing. Printing, using printing inks with pigments, are common for textiles that are collected and washed by industrial laundry services, such as work-wear, towels and bed linen used in hospitals and hotels.

Conventional processes that are efficient for decoloring of dyed textile material are in general inefficient for decoloring of textile material colored by pigmenting. The method of this disclosure provides for decoloring (and recycling) of clothes that have been colored by either (or both) dyeing and pigmenting.

Although the exact mechanism for decoloring using anionic polyelectrolytes may not have been fully understood, there are reasons to believe that it is at least partly based on dispersion and solubilization of pigments and/or dyes and dye residues with low solubility in the treatment solution. Examples of anionic polyelectrolytes, which are plausibly useful in accordance with this invention are salts of polymeric polyacids. By polymeric polyacid is meant a high molecular weight compound made up of one or more recurring structural units and containing a multiplicity of acid groups such as carboxylic acid groups, sulfonic acid groups, sulfuric acid groups, and the like.

Examples of potentially suitable anionic polyelectrolytes include carboxyalkyl ethers of cellulose, starch, amylose, amylopectin, and natural gums, for example, sodium carboxymethyl cellulose, sodium carboxymethyl starch, sodium carboxymethyl amylose, sodium carboxymethyl amylopectin, sodium carboxymethyl guar gum, sodium carboxymethyl locust bean gum, and the like. Further examples include polyacrylic acid, polymaleic acid, as well as acrylic acid maleic acid copolymer, polymethacrylic acid, and the like. Other examples include polymers of naphthalene sulfonic acids, sulfonated polystyrene, polyethylene sulfonate, and the like.

As will be shown further below, the decoloring is additionally efficient if the alkaline solution besides an anionic polyelectrolyte contains white liquor, i.e., a highly alkaline liquid mainly containing dissolved sodium hydroxide (NaOH), sodium sulfide ($Na_2S$) and water, as well as some other components, such as sodium carbonate ($Na_2CO_3$) used in Kraft pulping. The major cationic species in white liquor is $Na^+$, but also $K^+$ may be present in significant amounts. The major anionic species in white liquor are $OH^-$, $HS^-$ and $CO_3^{2-}$. The liquor also contains a number of minor constituents, such as sulfate and chloride and many others as traces. Besides sodium ions and hydroxide ions, such a solution contains a relatively high concentration of hydrosulfide ions ($HS^-$). The advantageous effect on the decoloring of textiles when using white liquor as alkali source in the decoloring method of this disclosure is believed to be mainly related to the presence of $HS^-$.

The one or more anionic polyelectrolytes used in the method as disclosed herein may be selected from the group: carboxymethyl cellulose (CMC): carboxyalkyl ethers of cellulose, starch, amylose, amylopectin and/or natural gums; polyacrylic acid; polymaleic acid; acrylic acid maleic acid copolymer; polymethacrylic acid; polymers of naphthalene sulfonic acids; sulfonated polystyrene; and polyethylene sulfonate.

The one or more anionic polyelectrolytes used in the method as disclosed herein may have a concentration in the alkaline solution of at least 0.01% (weight), or at least 0.05% (weight), or at least 0.1% (weight), in relation to a dry weight of the textile material. To set an upper limit does not appear to be necessary with regard to the decoloring effect but may be useful for reducing the costs for chemicals when applying the method on an industrial scale. The upper limit may then be set to below e.g. 10%, 5%, 1.5%, 1.2% or 1% (weight), in relation to the dry weight of the textile raw material. Experiments indicate that the decoloring effect does not increase significantly above around 1%.

The one or more anionic polyelectrolytes used in the method as disclosed herein may comprise carboxymethyl cellulose (CMC). The concentration of carboxymethyl cellulose (CMC) in the alkaline solution may be at least 0.01% (weight), or at least 0.05% (weight), or at least 0.1% (weight), in relation to a dry weight of the textile material. Similar to above, the upper limit may be set to below e.g., 10%, 5%, 1.5%, 1.2% or 1% (weight), in relation to the dry weight of textile material. CMC may be the main anionic polyelectrolyte in the alkaline solution or may be the only anionic polyelectrolyte in the alkaline solution.

The alkaline solution used in the method as disclosed herein may have a pH above 11, or above 12, or above 13.

The alkaline solution used in the method as disclosed herein may have a basicity corresponding to at least 0.2 g, or at least 0.4 g, or at least 1 g, dissolved sodium hydroxide (NaOH) per liter of the solution. Typically, the alkaline solution may have a basicity corresponding to 10 g or more dissolved sodium hydroxide (NaOH) per liter of the solution.

The concentration of alkali may also be defined in terms of effective alkali (EA). The term "alkaline solution" refers to the basic hydroxide ion. The hydroxide ion may be present in different compounds such as, but not limited to, salts of sodium and potassium. The concentration of alkali is here presented as sodium hydroxide (NaOH) equivalents regardless of counter ion. Further, the concentration of alkali may be determined by titration according to SCAN N 30:85 and SCAN N 33:94.

The alkaline solution used in the method as disclosed herein, may have an effective alkali (EA) concentration of at least 0.2 g, or at least 0.4 g, or at least 1 g, calculated as sodium hydroxide (NaOH) equivalents. The alkaline solution may have an effective alkali concentration in, for instance, a range from 5 g/l to 150 g/l, wherein the effective alkali concentration is calculated as NaOH.

The alkaline solution used in the method as disclosed herein may contain sulfide. As mentioned above, sulfur improves the decoloring effect and it is believed that the presence of $HS^-$ is important. If the alkaline solution contains sulfur, at least some of the sulfur will be present as $HS^-$. The content of sulfur and $HS^-$ can be specified in different ways.

The alkaline solution may have a sulfidity S (%) of at least 1%, or at least 5%, wherein the sulfidity is calculated as S (%)=100×(weight of $Na_2S$)/(total weight of NaOH+$Na_2S$) calculated as sodium equivalents and expressed as weight of NaOH, cf. SCAN N 30:85. Typically, the sulfidity may be around 30-40%, such as 35%, but in principle the sulfidity may be between 1% and 100% (when sulfur is present). Typical lower limits may be 10% or 20% and typical upper limits may be 80% or 60%.

The alkaline solution may have a total content of sulfide of at least 0.01 g, or at least 0.1 g, per liter of the alkaline solution. The content of sulfide may be higher, for instance some grams of sulfide per liter of the alkaline solution, such as 1, 2, 3, 5 grams or more. Sulfur may be present in different chemical forms.

The alkaline solution used in the method as disclosed herein may contain industrial white liquor. As mentioned above, such white liquor contains mainly NaOH and $Na_2S$ and is used e.g., in Kraft pulp processes for digesting and decomposition of wood-based raw material. The alkaline solution may contain or substantially consist of such white liquor. Some anionic polyelectrolyte(s) can be added to the liquor. The alkaline solution may also contain a mix of liquids typically formed in a Kraft pulp process, such as so-called black liquor formed during/after wood digestion and/or green liquor formed in the process of recovering chemicals. Treatment with black liquor might result in adsorption of lignin from the black liquor onto the textile material, which might lead to brown colouring. However, such colouring can be removed by adding a step to the method where the recovered textile material is bleached. Various bleaching process are well known as such.

As set out herein, the treatment period is at least 10 min, preferably at least min. Longer treatment times may be required depending on e.g., temperature or composition of the alkaline solution, or the total amount of textile material in relation to the amount of alkaline solution, or the particular type or mix of textile material, or the amount of colored textile material in relation to the amount of alkaline solution, or the degree or type of coloring of colored textile material. In an industrial process, there is a trade-off between production rate of recovered textile material (i.e., production of decolored textile material, which may also be recycled textile material and cellulose-based material separated from polyester-based material) and, for instance, degree of decoloring, production costs (heating, handling of waste, etc.) and, if cellulose-polyester separation is involved, degree of or yield from separation. The treatment period in an industrial process may be longer than the minimum of 10 min given above, such as at least 30 min or at least 60 min. A maximum treatment period of a few hours may be used. However, even longer treatment times are possible.

The alkaline solution may have, at least during a portion of the treatment period, a temperature in the range 110° C.-180° C., 120° C.-170° C., or 120° C.-150° C. In principle, the rate and the efficiency of the decoloring process increase with temperature, as also any hydrolysis of polyester material. However, the cellulose hydrolysis rate in alkaline solutions increases with increasing temperatures and at temperatures above approximately 170° C., cellulose degradation may be undesirably high, at least at longer treatment times. An example of a suitable temperature may therefore be around 140° C. The temperature may be varied during the treatment period, it is for instance possible to start the treatment at a lower temperature, such as 100° C., and raise it to e.g., 140° C. during the treatment period.

The textile raw material may comprise cellulosic fibers. Examples of cellulosic fibers used in textile materials comprise cotton, viscose, modal, lyocell and flax.

The textile raw material may comprise polyester fibers and/or may comprise both polyester fibers and cellulosic fibers. Efficient dissolution of polyester material and efficient separation of polyester material from cellulosic material can be obtained over a wide range of mixture ratios between polyester fibers and cellulosic fibers.

The method as disclosed herein may comprise a step of mechanically disintegrating the textile raw material before treating it in the alkaline solution. Although disintegration may not be needed, it generally makes the decoloring more efficient.

At least a part of the textile raw material to be treated may be colored with pigments such as by pigment printing or pigment dyeing.

At least a part of the textile raw material to be treated may be colored with dyes such as direct dyes, vat dyes, sulfur dyes, reactive dyes or combinations thereof.

The textile raw material to be treated and decolored in the method as disclosed herein, may include any mixture of textiles which have been colored with pigments and textiles which have been colored with dyes, as well as a portion of non-colored textiles.

The invention also concerns a method for recycling of a textile material, wherein the method comprises steps according to the above decoloring method. The term recycling can be regarded to mean the action of reprocessing a material or component which has previously been processed, for inclusion in a product. In such a recycling method, the textile raw material to be treated comprises reclaimed textile material, i.e., material that would have otherwise been disposed of as waste or used for energy recovery but has instead been collected and reclaimed (recovered) as a material input, in lieu of new primary material, for a recycling or reuse process.

The invention also concerns a textile material recovered from a decoloring method as disclosed herein.

In the decoloring method of this disclosure, different ratios between the volume of the alkaline solution and the dry weight of the textile raw material may be used. The method works efficiently from high volume/weight-ratios down to around 1 liter solution per kg dry textile raw material, or even lower. A typical volume/weight-ratio may be 2-40 liter/kg, preferably 3-20 liter/kg. It is generally an advantage to use as small volume of solutions as possible for cost and handling reasons. The method may be carried out batchwise or continuously.

The invention also concerns a process plant, wherein the plant is configured to carry out a method for decoloring of a textile material as disclosed herein.

The process plant may be configured to carry out also a Kraft pulp process comprising digesting and decomposing wood-based material and further comprising a process for recovering of chemicals used for digestion, wherein the alkaline solution used in the method for decoloring of the textile material contains components obtained from the Kraft pulp process. For instance, the alkaline solution may contain or substantially consist of white liquor used for wood digestion in the Kraft pulp process; it may also contain e.g., black liquor generated during digestion, and/or green liquor obtained from the recovery process.

BRIEF DESCRIPTION OF DRAWINGS

In the description of the invention given below reference is made to the following figures.

DESCRIPTION OF EXAMPLES

In the following it will, for instance, be described some experiments showing the effects of the decoloring method as disclosed herein.

Example 1—Reference Example

A polycotton bed sheet (polyester and cotton) with printed blue parts (lines) was separated into a blue-enriched fraction (by cutting out these parts). The samples were mechanically disintegrated and treated with an aqueous solution of sodium dithionite at two different pH-levels together with a reference without dithionite addition (Sample 1.3). To the sample with low pH sodium acetate, 5 g/l, was added, and to the sample with high pH sodium carbonate, 5 g/l, was added. This experiment was performed as a reference experiment since sodium dithionite is commonly used for removing color from textiles.

The treatments were performed using 5 g (dry) of textile material and a liquor to textile ratio of 40:1 liter/kg and with an addition of sodium dithionite of 2.5% on textile weight. The temperature during the treatments were 70° C. and the duration was 60 minutes. The samples were washed with water and the optical properties were evaluated using a Minolta Spectrophotometer CM-3630. The samples used for optical evaluation were prepared according to ISO 36:88. The reflectance values over the measured wavelengths (360-740 nm with spatial resolution of 10 nm) were used as such but also converted to the ratio between the light absorption coefficient (k) and the light scattering coefficient (s) using the Kubelka-Munk relation $k/s=(1-R_\infty)^2/2/R_\infty$. The benefit of recalculating to k/s is that this ratio is linearly correlated to the chromophore concentration (at the same s) which the reflectance is not. Also, the CIELAB Lab-values give important information on color and were determined. In some cases, the C/2 illuminant/observer is used (ISO-brightness etc.) but in other cases it is interesting to look at the D65-values especially in relation to fluorescent structures like optical brightening agents (due to higher amount of UV-radiation in D compared to C illuminant). The experimental details and results can be seen in Table 1. Treatment with dithionite is clearly inefficient for removing the color from the textiles.

TABLE 1

Experimental overview and results for Example 1. The optical properties reported were measured using C/2 illuminant and observer.

| | Material | pH | Sodium dithionite | $R_{457}$ (%) | L* | a* | b* |
|---|---|---|---|---|---|---|---|
| Starting material | Enriched blue | — | — | 71.58 | 82.38 | −7.14 | −9.06 |
| Sample 1.1 | Enriched blue | 5.95 | YES | 72.18 | 82.29 | −6.47 | −9.72 |
| Sample 1.2 | Enriched blue | 10.65 | YES | 72.96 | 82.84 | −5.80 | −9.44 |
| Sample 1.3 | Enriched blue | 6.30 | NO | 70.56 | 82.12 | −6.80 | −8.66 |

Figure 1:
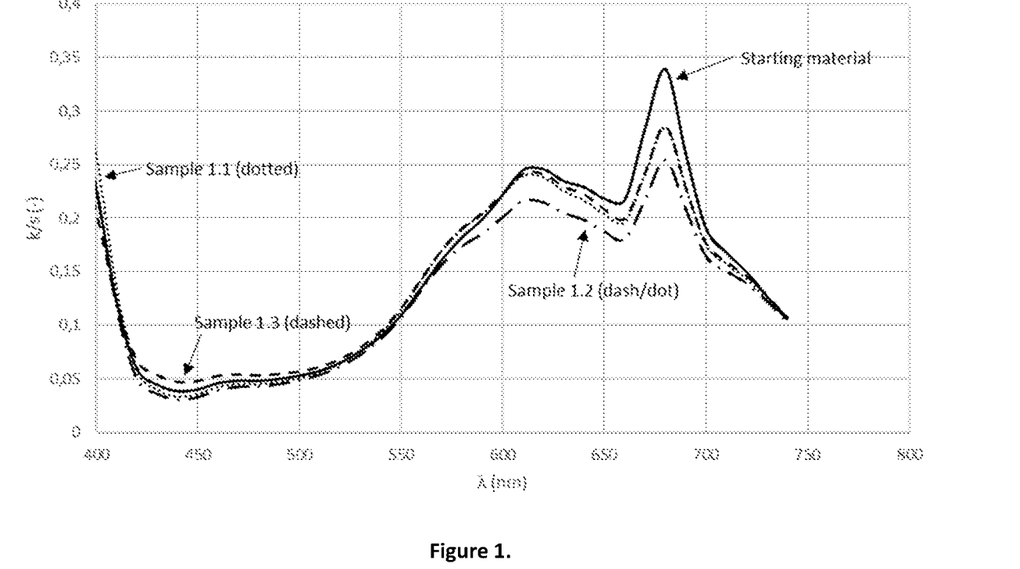
FIG. 1. Reference example with sodium dithionite. The ratio k/s calculated from reflectance using D65/10.

Based on the effect on brightness ($R_{457}$) and L*a*b*-values the treatments are almost without effect. When looking at the UV-VIS-absorption using k/s (FIG. 1) there is a very small effect in the visible region at longer wavelengths. The reference treatment with water is as efficient as the treatment with dithionite at lower pH but the treatment at pH 10.65 gives an additional small benefit compared to the others.

Example 2

The same material, "enriched blue", was treated in autoclaves in a hot-air oven (CAS 420 Autoclave Oven, manufactured by CRS Reactor Engineering AB, Sweden, equipped with acid resistant steel 1.4433 autoclaves, with a volume of 3 liters each). The following procedure was applied: 100 g (dry) textile material was added to an alkaline aqueous solution containing 0 or 1% CMC (carboxymethyl cellulose) on textile weight in the form of Blanose 7MC (Ashland Inc.), with a liquor:textile=9:1 (kg/kg) and an effective alkali addition of 34.5% based on textile weight (diluted industrial white liquor; EA=38.3 g/l, sulfidity=34%). The heating from 25° C. to 70° C. was performed at a constant rate of 0.75° C./min. After 15 minutes stabilization of the temperature at 70° C., the temperature was raised with 0.75° C./min to the final temperature of 140° C. and holding time at maximum temperature=60 minutes. After cooling the samples were washed thoroughly with deionized water, see results in Table 2. The optical properties were evaluated as in Example 1.

TABLE 2

Results for Example 2. The optical properties are measured using C/2 illuminant and observer.

| | Material | CMC | $R_{457}$ (%) | L* | a* | b* |
|---|---|---|---|---|---|---|
| Starting material | Enriched blue | | 71.58 | 82.38 | −7.14 | −9.06 |
| Sample 2.1 | Enriched blue | NO | 87.53 | 93.96 | −1.63 | −1.77 |
| Sample 2.2 | Enriched blue | YES | 89.24 | 95.35 | −1.18 | −0.6 |

Figure 2:
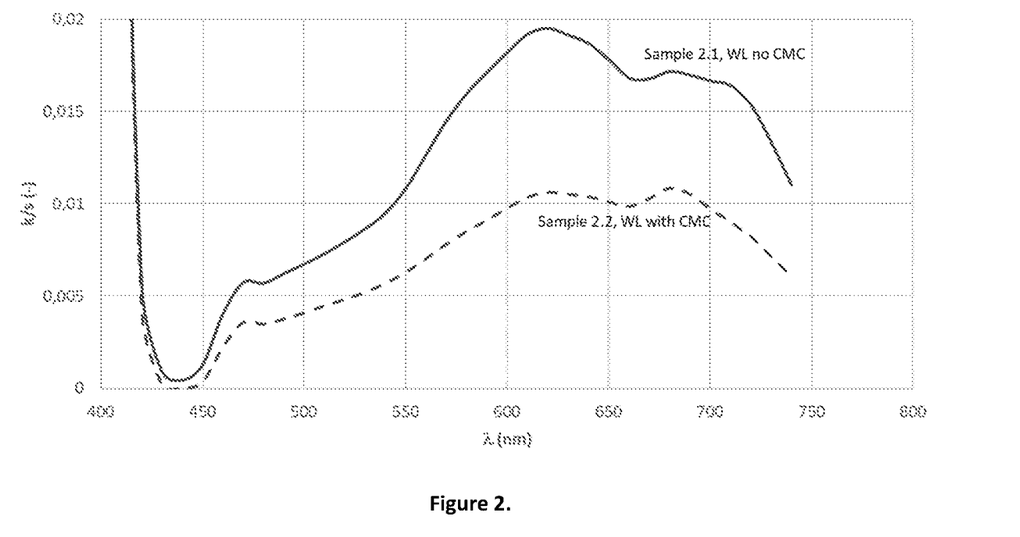
FIG. 2. The effect of CMC in white liquor. The ratio k/s calculated from reflectance as described using D65/10.

The effect of CMC is further exemplified in FIG. 2. The reference is still clearly blue, but when CMC is added the k/s-ratio is decreased, showing much more color removal.

The same "blue-enriched" material used in Example 1 were used in Example 2 and the k/s-ratios of the recovered material after treatment using dithionite in Example 1, is at least an order of magnitude larger than those reported for the alkaline treatment in combination with CMC.

Example 3

To further investigate the effect of CMC another sample of "blue-enriched polycotton" was used with different addition levels of CMC (Blanose 7MC) was tried (0.1; 0.5 and 1% on textile weight). The experiment was performed according to the method in Example 2 and the optical properties evaluated according to the method in Example 1.

TABLE 3

Results for Example 3. WL stands for industrial white liquor. The optical properties reported were measured using C/2 illuminant and observer.

|  | CMC (% on textile weight) | $R_{457}$ (%) | L* | a* | b* |
| --- | --- | --- | --- | --- | --- |
| Starting material |  | 76.41 | 86.65 | −3.5 | −5.76 |
| Sample 3.1 | 0 | 88.56 | 94.14 | −1.29 | −2.24 |
| Sample 3.2 | 0.1 | 89.94 | 95.24 | −0.68 | −1.31 |
| Sample 3.3 | 0.5 | 90.10 | 95.47 | −0.51 | −1.02 |
| Sample 3.4 | 1 | 90.61 | 95.53 | −0.47 | −1.29 |

Figure 3:
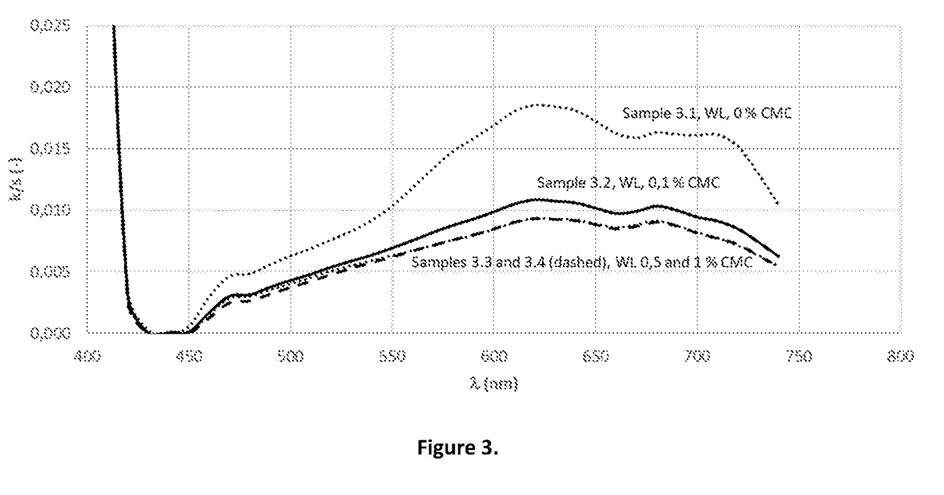
FIG. 3. The effect of different levels of addition of CMC using white liquor (D65/10).

As can be seen in FIG. 3, the addition of such a small amount of CMC as 0.1% based on textile weight gives a large effect, there is a larger effect at 0.5%, but 1% does only improve the blue pigment removal to a very low degree in the short wavelengths. This show that only a rather small amount of CMC is needed to reach maximum effect.

Example 4

To further investigate the effect of CMC (Blanose 7MC) in combination with NaOH, the same material as in Example 3, consisting of "blue-enriched polycotton" was used. Apart from the fact that the alkali source was pure NaOH the experiments were performed according to Example 2 and the results evaluated according to Example 1.

TABLE 4

Results for Example 4. The optical properties reported were measured using C/2 illuminant and observer.

|  | CMC (% on textile weight) | $R_{457}$ (%) | L* | a* | b* |
| --- | --- | --- | --- | --- | --- |
| Starting material |  | 76.41 | 86.65 | −3.5 | −5.76 |
| Sample 4.1 | 0 | 87.72 | 92.95 | −1.94 | −3.64 |
| Sample 4.2 | 1 | 88.70 | 93.67 | −1.39 | −3.10 |

Figure 4:
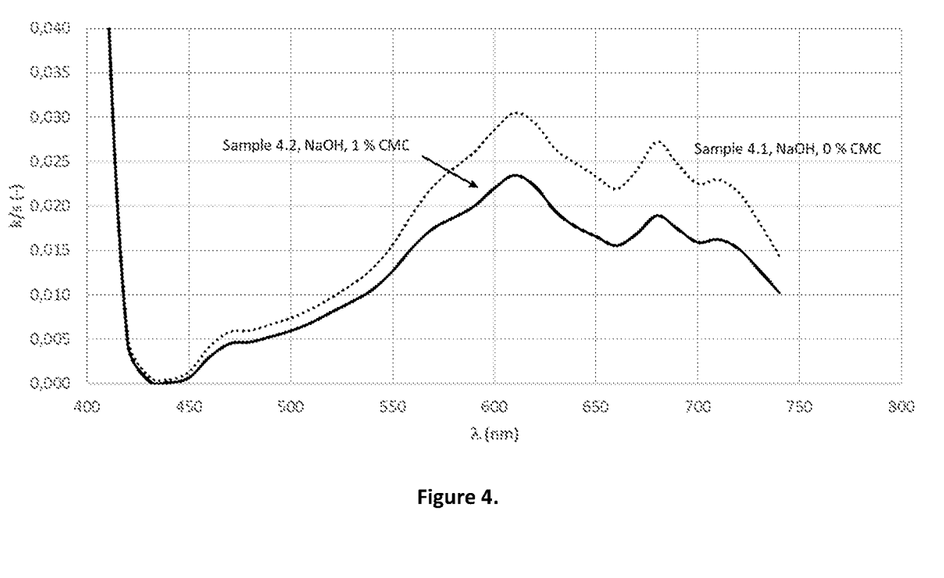
FIG. 4. The effect of different levels of addition of CMC using NaOH (D65/10).

The effect of CMC is clear also in combination with pure NaOH and this is also made visual in FIG. 4, where the k/s-ratio is shown for pure NaOH with and without addition of CMC.

Example 5

Different types of CMC have different molecular weights and different degrees of substitution (DS). This influences the solubility and dispersing ability mainly due to differences in charge density. To investigate the effect of different CMC types, the following trials on another batch of "enriched blue polycotton textile" were performed. The experiment was performed according to the method in Example 2 but with 30 g (dry) textile material and the optical properties evaluated according to the method in Example 1. Commercial CMC grades Blanose 7LC, Blanose 7MC, Blanose 7HC from Ashland were tried together with Nymcel ZSB-10 from Noviant/CP Kelco and Niklacell P70 UC from Mare. The samples named Blanose have a degree of substitution at 0.65-0.9 with varying molecular weights (L=low molecular weight, M=medium molecular weight and H=high molecular weight). Nymcel ZSB-10 has a low degree of substitution (DS=0.2) with medium molecular weight and Niklacell P70 UC a degree of substitution of 0.5-0.65, with medium to high molecular weight. The results are summarized in Table 5 and show that all of the different types of CMC are effective in removing color.

TABLE 5

Results for Example 5. The optical properties reported were measured using C/2 illuminant and observer.

Figure 5:
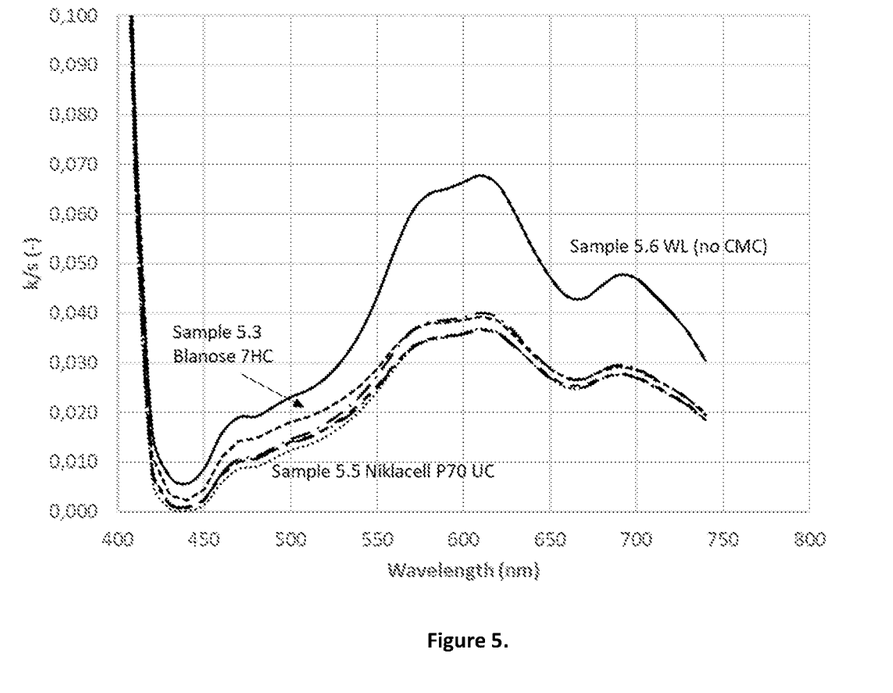
FIG. 5. Effect of different types of CMC in decoloring a dyed textile mixture using white liquor with and without CMC. The ratio k/s calculated from reflectance using D65/10.

|  | CMC | $R_{457}$ (%) | Line in FIG. 5 |
| --- | --- | --- | --- |
| Sample 5.1 | Blanose 7LC | 83.70 | — · — · · — |
| Sample 5.2 | Blanose 7MC | 84.00 | — · · — · |
| Sample 5.3 | Blanose 7HC | 81.81 | — — — — |
| Sample 5.4 | Nymcel | 84.01 | — — — |
| Sample 5.5 | Niklacell P70 UC | 84.91 | ·················· |
| Sample 5.6 | No CMC, WL | 79.93 | ─────── |

The beneficial effect of CMC is seen for all types of tested CMC with small differences between them. The highest effect is seen with Niklacell P70 UC and the smallest effect with Blanose 7HC with the remaining three in between but closer to Niklacell P70 UC.

Example 6

To exemplify the effect of the treatment on pigment-colored textiles an Example of a commercial pigmented cotton shirt was procured (Stenströms Navy Pigment Dyed Polo Shirt, Art nr: 4400112480190), mechanically disintegrated, and treated according to the procedure in Example 2, but with g (dry) textile material.

Figure 6:
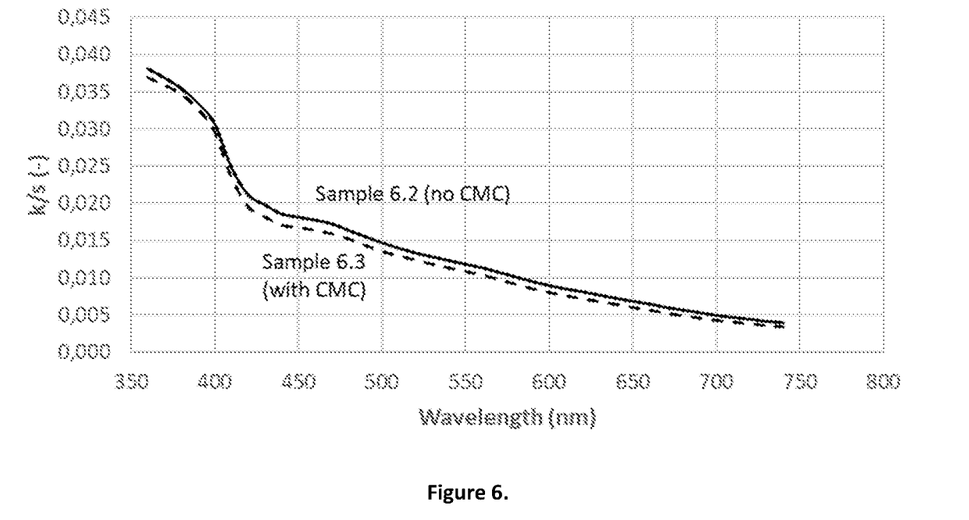
FIG. 6. Effect of added CMC in decoloring a dark blue pigmented textile using white liquor as alkali source. The ratio k/s calculated from reflectance using D65/10.
Figure 7:
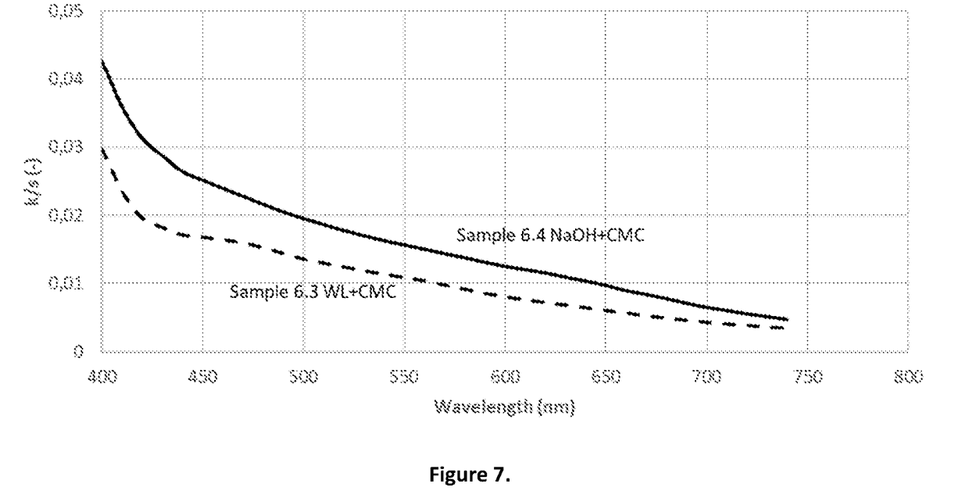
FIG. 7. Effect of added CMC in decoloring a dark blue pigmented textile comparing NaOH and white liquor (WL) as alkali source. The ratio k/s calculated from reflectance using D65/10.

After the treatment the resulting material was washed, and the optical properties evaluated according to the method in Example 1. As can be seen in Table 6 and FIGS. 6, a clear beneficial effect of the added CMC was noted. In FIG. 7 the addition of HS— in the WL show an improved effect compared to when only treating the textile with pure NaOH.

TABLE 6

Results for Example 6. The optical properties reported were measured using C/2 illuminant and observer.

|  | Material | CMC | Alkali | $R_{457}$ (%) | L* | a* | b* |
| --- | --- | --- | --- | --- | --- | --- | --- |
| Sample 6.1 | Untreated Dark blue | — | — | 8.72 | 27.30 | 0.21 | −13.93 |
| Sample 6.2 | Dark blue | NO | WL | 82.43 | 94.31 | 0.35 | 2.71 |
| Sample 6.3 | Dark blue | YES | WL | 83.02 | 94.56 | 0.40 | 2.70 |
| Sample 6.4 | Dark blue | YES | NaOH | 79.92 | 93.42 | 0.14 | 3.17 |

Example 7

Figure 8:
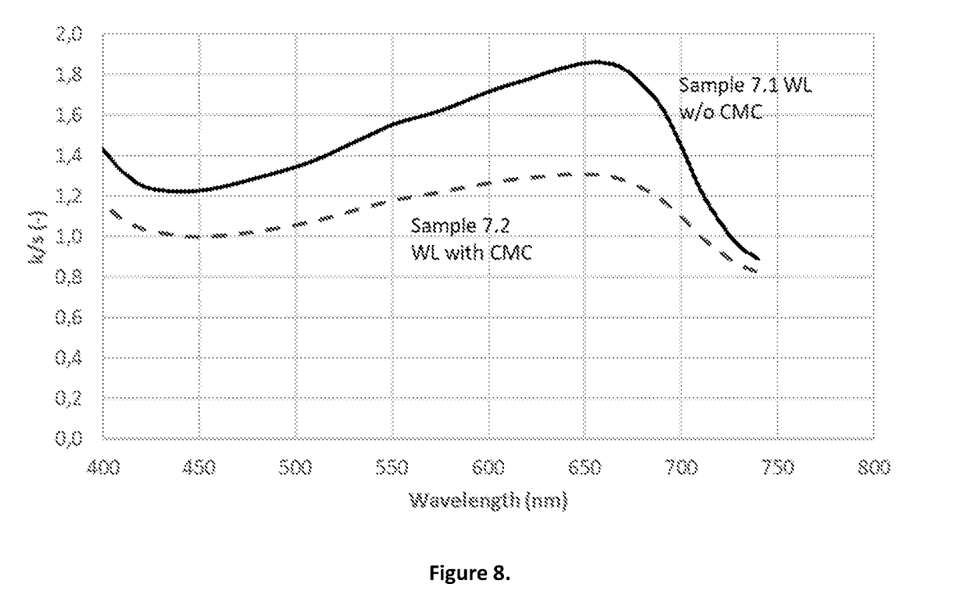
FIG. 8. Effect of added CMC in decoloring a blue denim textile using white liquor with and without CMC. The ratio k/s calculated from reflectance using D65/10.
Figure 9:
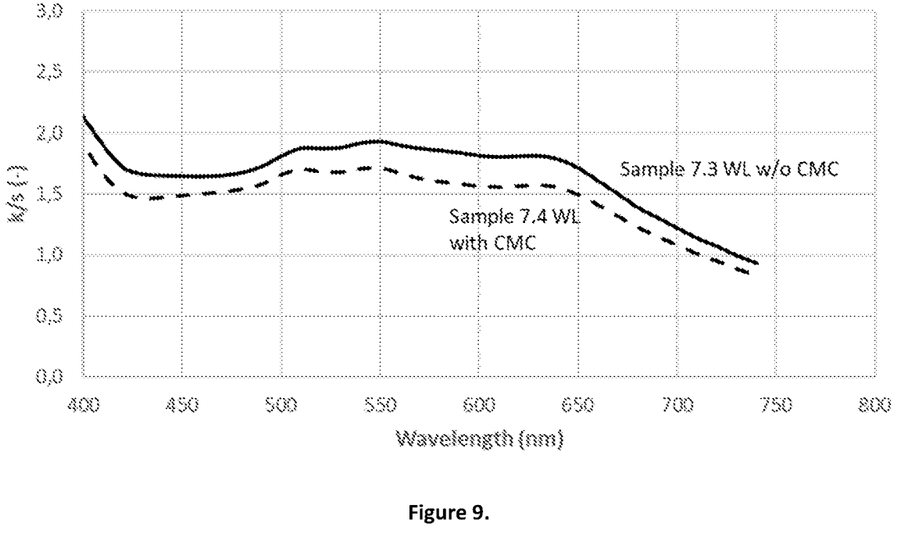
FIG. 9. Effect of added CMC in decoloring a dyed textile mixture using white liquor with and without CMC. The ratio k/s calculated from reflectance using D65/10.

In order to investigate the influence of the treatment on textile colored by other dyes than pigments a denim textile and a mixture of many common and dyed textiles were treated with white liquor with and without CMC. The same procedure as in Example 2 was used to treat the samples, but with 40 g (dry) textile material, and the analysis of the optical properties was performed according to the procedure in Example 1. As can be seen in FIGS. 8 and 9 the effect of CMC is significant and positive also for these colored materials.

TABLE 7

Sample list for Example 7. The optical properties reported were measured using C/2 illuminant and observer.

| | Material | CMC | $R_{457}$ (%) |
|---|---|---|---|
| Starting material | Denim | | 18.37 |
| Sample 7.1 | Denim | NO | 23.40 |
| Sample 7.2 | Denim | YES | 26.57 |
| Starting material | Mixture | | 8.72 |
| Sample 7.3 | Mixture | NO | 19.33 |
| Sample 7.4 | Mixture | YES | 20.63 |

Examples of Industrial Processes

In one example the decoloring method as disclosed herein forms part of a method for recycling of reclaimed textile material. The recycling method may additionally provide for separation and recovery of a cellulosic part from a material blend of polyester and cellulose, making use of CMC so as to provide for decoloring.

In this exemplified process the following apply:

Textile material: a mix of reclaimed textile material including around 50% polyester and around 50% cotton; a portion of the textile material to be treated is colored;

Mechanical treatment for disintegration of the textile material

Volume of alkaline aqueous solution in relation to dry weight of textile material: 9:1 (i.e. 9 l/kg);

Concentration of certain species in the alkaline solution: effective alkali concentration (NaOH): 38 g/l; sulfidity S (%) 36%; CMC 1% (weight) in relation to the dry weight of the textile material;

The alkali used in the treatment originates from white liquor obtained from a Kraft pulp process;

The process/method includes a step of adding CMC to the alkaline solution so as to obtain the desired concentration.

The temperature during treatment of the textile material in the alkaline solution containing CMC is adjusted to around 140° C.

The treatment period can be adapted to the particular situation, but in a typical industrial situation the temperature is maintained at 140° C. for 1-2 hours.

After the treatment period, the recovered fibers are separated from the treatment solution.

The process/method may also include additional cleaning and/or purification process steps for handling of the recovered cellulose-containing textile material, such as bleaching of a recovered cellulosic part, washing, screening and adjustment of a degree of polymerization of the recovered cellulosic part, and drying.

The recovered cellulose-containing textile material can be used to produce molded bodies, such as fibers, to produce new textile material.

Various variations of the above example are possible. For instance, the aqueous treatment solution may be a mix of white and black liquor obtained from the Kraft pulp process. Moreover, instead of obtaining the alkaline solution from a Kraft pulp process, it is possible to obtain the alkaline solution by dissolution of sodium hydroxide and sodium sulfide salts. Further, as an alternative or complement to CMC, the solution may contain one or more other polyelectrolyte(s). Also, other concentrations of the species in the alkaline solution may be used and e.g., treatment temperature and time can be varied and adjusted to the particular application.

The invention is not limited by the embodiments described above but can be modified in various ways within the scope of the claims.

The invention claimed is:

1. A method for recycling and decoloring of a textile material, the method comprising the steps of:
   providing a textile material comprising polyester fibers and cellulosic fibers, at least a portion of the textile material being colored;
   providing an alkaline solution containing one or more anionic polyelectrolytes selected from the group consisting of: carboxymethyl cellulose (CMC), a carboxyalkyl ether of cellulose, a carboxyalkyl ether of starch, a carboxyalkyl ether of amylose, a carboxyalkyl ether of amylopectin and a carboxyalkyl ether of a natural gum, or a combination thereof;
   treating the textile material in the alkaline solution during a treatment period of at least 10 minutes at a temperature in the range of from 100° C. to 180° C.;
   separating the cellulosic fibers from the textile material; and
   recovering the cellulosic fibers from the alkaline solution after the treatment period,
   wherein the method comprises a step of mechanically disintegrating the textile material before treating it in the alkaline solution.

2. The method according to claim 1, wherein the one or more anionic polyelectrolytes has a concentration of at least 0.01% (weight) in relation to a dry weight of the textile material.

3. The method according to claim 2, wherein the one or more anionic polyelectrolytes has a concentration of 1.5% (weight) or less in relation to a dry weight of the textile material.

4. The method according to claim 1, wherein the one or more anionic polyelectrolytes comprises carboxymethyl cellulose (CMC) and wherein the concentration of the carboxymethyl cellulose (CMC) is at least 0.01% (weight) in relation to a dry weight of the textile material.

5. The method according to claim 1, wherein the alkaline solution has a pH above 11.

6. The method according to claim 1, wherein the alkaline solution has a basicity corresponding to at least 0.2 g dissolved sodium hydroxide (NaOH) per liter of the alkaline solution.

7. The method according to claim 1, wherein the alkaline solution has an effective alkali (EA) concentration of at least 0.2 g calculated as sodium hydroxide (NaOH) equivalents.

8. The method according to claim 1, wherein the alkaline solution comprises sulfide.

9. The method according to claim 7, wherein the alkaline solution has a sulfidity S (%) of at least 1%, wherein the sulfidity is calculated as S (%)=100×(weight of $Na_2S$)/(total weight of NaOH+$Na_2S$).

10. The method according to claim 8, wherein the alkaline solution has a total content of sulfide that is at least 0.01 g per liter.

11. The method according to claim 1, wherein the alkaline solution contains industrial white liquor.

12. The method according to claim 1, wherein the treatment period is at least 30 min.

13. The method according to claim 1, wherein the alkaline solution has, at least during a portion of the treatment period, a temperature in the range of 110° C. to 180° C.

14. The method according to claim 1, wherein the method further comprises a step of adjusting a viscosity of the recovered cellulosic fibers.

15. The method according to claim 1, wherein the method causes the polyester fibers to dissolve.

\* \* \* \* \*